United States Patent [19]
Schnyder

[11] 3,794,176
[45] Feb. 26, 1974

[54] MECHANICAL-BIOLOGICAL WASTE WATER PURIFICATION PLANT

[76] Inventor: Hans Schnyder, Wattenwylstrasse 29, Worb, Switzerland

[22] Filed: Nov. 30, 1972

[21] Appl. No.: 310,695

[30] Foreign Application Priority Data
Dec. 3, 1971 Switzerland...................... 17692/71

[52] U.S. Cl................. 210/242, 210/220, 210/260, 210/294, 210/532 S
[51] Int. Cl............................................. C02c 1/26
[58] Field of Search..... 210/83, 170, 205, 207, 218, 210/242, 252, 256, 259–261, 294, 532, 532 S, 533, 536, 540

[56] References Cited
UNITED STATES PATENTS

| | | | |
|---|---|---|---|
| 3,618,773 | 11/1971 | Jacquet............................ | 210/256 X |
| 3,617,544 | 11/1971 | Voss et al. ........................ | 210/207 X |
| 2,889,929 | 6/1959 | Kivell................................ | 210/261 X |
| 1,955,308 | 4/1934 | Naftel et al. ......................... | 210/242 |
| 1,702,256 | 2/1929 | Green ................................ | 210/207 |
| 924,664 | 6/1909 | Imhoff.............................. | 210/532 S |

FOREIGN PATENTS OR APPLICATIONS

| | | | |
|---|---|---|---|
| 233,486 | 9/1963 | Austria ............................... | 210/256 |

*Primary Examiner*—John Adee
*Assistant Examiner*—Robert H. Spitzer
*Attorney, Agent, or Firm*—McGlew and Tuttle

[57] ABSTRACT

The plant is a pre-clarifying plant designed for connection to a clarifying plant or to a post-clarifying plant, and includes a pre-clarifying basin and a sludge digestion tank or zone arranged beneath and communicating with the basin. A feed inlet communicates with the upper portion of the basin and an adjustably positionable pipe, such as either a flexible pipe or a jointed pipe, is within the clarifying basin and has an inlet end communicating with a device, such as a weir, floating on the liquid in the basin. The outlet end of the discharge pipe extends through a side wall of the basin at a level below the feed inlet. The discharge pipe has a flow rate less than the flow rate of the feed inlet, as by having a relatively reduced cross sectional area or a restriction, so that the pre-clarifying basin has a first buffer zone whose height corresponds to the vertical distance between the feed inlet and the outlet end of the discharge pipe. The pre-clarifying basin is arranged inside the upper part of a tank whose lower part defines a sludge digestion zone, whereby the upper part of the tank defines a second buffer zone open at the bottom and delimited laterally by the wall of the tank and the side walls of the pre-clarifying basin, and at least one valve vents the upper part of the second buffer zone. The arrangement delays level equalization, as effected by communication by the pre-clarifying basin and the sludge digestion zone. The discharge pipe communicates with a post-clarifying plant having an activated sludge zone which communicates with the upper portion of the second buffer zone in the pre-clarifying plant. The post-clarifying plant has a clarifying basin communicating with the activated sludge zone and provided with a floating weir connected by a flexible or jointed discharge pipe to a clarified water outlet located some distance below the upper end of the post-clarifying basin. Sludge transferred by vacuum from the post-clarifying plant to the pre-clarifying plant is removed from the sludge digestion zone of the latter by a suitable pump.

10 Claims, 5 Drawing Figures

3,794,176

PATENTED FEB 26 1974

MECHANICAL-BIOLOGICAL WASTE WATER PURIFICATION PLANT

FIELD AND BACKGROUND OF THE INVENTION

This invention relates to mechanical-biological waste water purification plants and, more particularly, to a novel and improved preliminary clarifying plant arranged for connection to a post-clarifying plant and suitable particularly as a small clarifying plant which has a very small overall size with a maximum load capacity.

Known mechanical clarifying plants, such as have already been used, for example for remote residential units, camping sites, resort hotels, etc. comprise, for cost reasons, substantially only a basin in the lower part of which sludge can settle, while the waste water, which is thus freed of easily deposited sediments, has been discharged into available water courses such as lakes or rivers. However, the increased requirements for waste water purification no longer permit operations of this type.

The multi-stage waste water purification customary in large plants, with anaerobic and aerobic sludge treatment, requires several treatment stages. In small clarifying plants with aerobic sludge treatment, the advantages of preliminary clarification, that is, settling out of the coarse substances, are therefore foregone, so that the waste must be crushed in the plant and there is an increased oxygen demand in the aerobic sludge treatment. In addition, sludge must be removed twice a year in the so-called total oxidation plants. Bacteriological investigation of the aerobically stabilized sludge shows that the number of fecal coli is higher, by 1/10 of 1 percent, as compared to digested or anaerobically treated sludge.

SUMMARY OF THE INVENTION

The objective of the present invention is to solve the problem of attaining the advantages of waste water purification, with preliminary clarification, for small clarifying plants and at a relatively low expense.

To solve this problem, the invention provides a waste water purifying plant, of the above-mentioned type, which is characterized by a flexible, or at least jointed, discharge pipe passing through a clarifying basin, and whose outlet end extends through the basin wall below the level of a feed inlet to the basin. The cross section of the discharge pipe is smaller than the cross section of the basin inlet, or, alternatively, a restriction is provided in the discharge pipe. Thereby, the pre-clarifying basin has a first buffer zone whose height corresponds to the vertical distance between the basin inlet and the outlet end of the discharge pipe. The clarifying basin is arranged inside the upper part of a chamber or tank whose lower part forms a sludge digestion tank, so that a second buffer zone is provided in the upper tank or chamber part and is opened at the bottom and delimited laterally by the wall of the tank and by the side wall of the clarifying basin. The upper part of the second buffer zone is ventilated by at least one valve, so that equalization of the level, occurring due to communication between the clarifying basin and the sludge digestion zone, is delayed.

The design of a waste water purifying plant, in accordance with the invention, permits a much smaller size, since its dimensions do not depend directly on the maximum amount of waste water expected to be supplied, because the outflow rate is, to a great extent, independent of the inflow rate.

The walls of the clarifying basin can be inclined in a known manner, so that the sediments concentrate at the bottom toward the center of the basin and can then be conducted into the sludge digestion tank beneath the basin. A reduction of the height of the basin can be attained by subdividing the clarifying basin, at least in its part below the passage of the discharge pipe through the basin wall, into at least two juxtaposed basin chambers, also provided with inclined wall.

An object of the invention is to provide an improved waste water purification plant with preliminary clarification.

Another object of the invention is to provide such a waste water purification plant for small clarifying plants at a relatively low expense.

A further object of the invention is to provide such a waste water purifying plant which permits a much smaller size for a given waste water receiving capacity.

Yet another object of the invention is to provide such a plant whose dimensions do not depend directly on the maximum amount of expected waste water supply.

A further object of the invention is to provide such a plant in which the outflow rate is, to a great extent, independent of the inflow rate.

For an understanding of the principles of the invention, reference is made to the following description of a typical embodiment thereof as illustrated in the accompanying drawings.

DESCRIPTION OF THE PREFERRED EMBODIMENT

Figure 1:
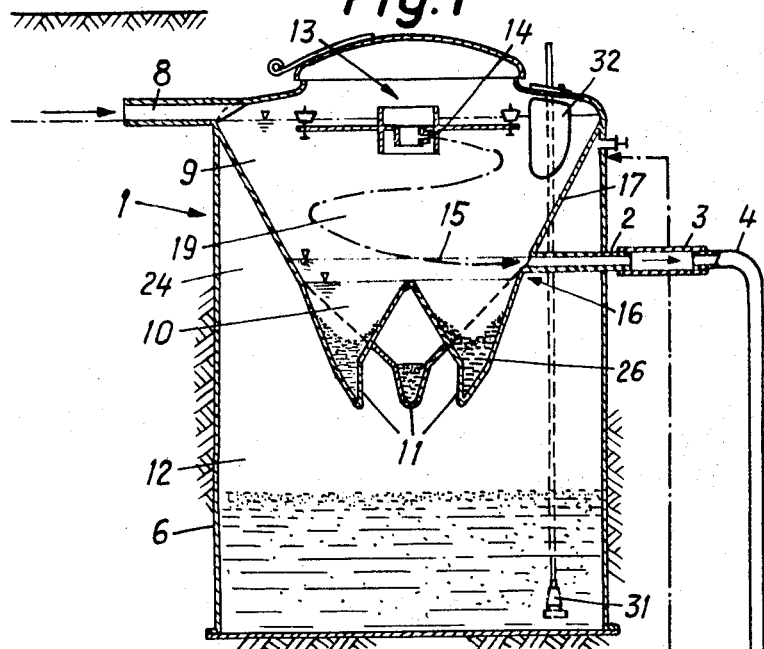
FIG. 1 is a vertical sectional view through a waste water purification plant, with pre-clarification and post-clarification, in a simplified representation.
Figure 1:
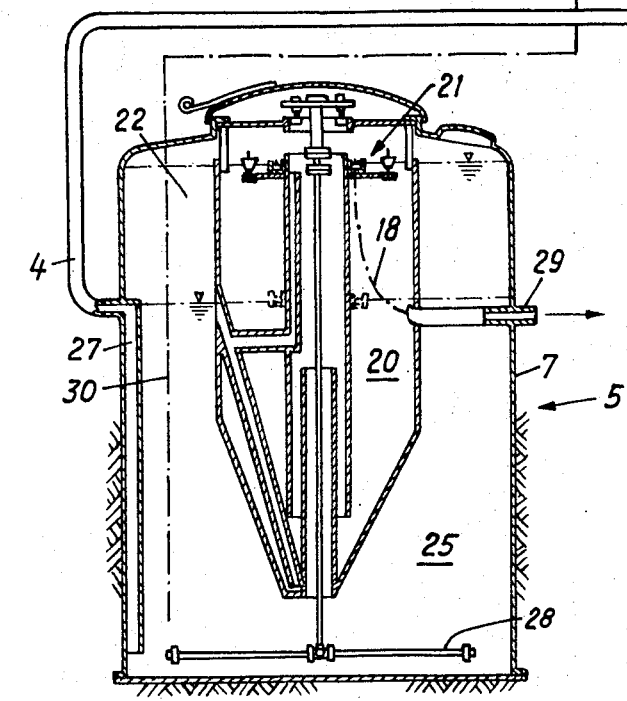

Referring to FIG. 1, a pre-clarifying plant 1 has an outlet pipe 2 connected by a connection 3 with the feed pipe 4 of a post-clarifying plant 5. Both plants 1 and 5 preferably are bounded by respective cylindrical tanks 6 and 7, which can be made of fiber-reinforced plastic, particularly for small plants, so that each plant can be transported in prefabricated form. For transportation on the road, the diameter of each tank must not exceed, however, a certain size, for example 3.5 meters, so that the overall size is limited in such small plants. How the capacity can be increased, in accordance with the invention, without changing the overall dimensions of tank 6, of the preclarifying plant, and of tank 7, of the post-clarifying plant, by providing a buffer zone in the pre-clarifying basin and in the sludge digestion zone, will become clear from the following description.

Unclarified raw water flows through the feed inlet pipe 8 into a pre-clarifying basin 9 positioned in the upper part of the tank 6, and in which separation into depositable suspended and coarse substances takes place, since the coarse substances sink into the lower part of the pre-clarifying basin and arrive therefrom, through openings 11, in sludge digestion tank or zone 12 arranged beneath the pre-clarifying basin 9. The floating substances, contained in the raw water, are retained on the water level by a floating weir 13 on which is secured the inlet end 14 of a flexible discharge pipe 15 indicated by a broken line. The outlet end 16 of discharge pipe 15 is conducted, at a point substantially below the level of basin inlet 8, laterally through the basin wall 17 as well as through the wall of tank 6 and forms an outlet pipe 2. A restrictor in discharge pipe 15, or in discharge pipe 18 of post-clarifying tank 7 communicating with pre-clarifying tank 6, assures that the rate of flow of the water through the total plant is substantially constant, so that the varying volume of the raw water coming in through feed pipe 8 results merely in a change in the height of the liquid level between the maximum and minimum values as represented in the drawings, particularly FIGS. 3, 4 and 5.

Due to the flexibility of discharge pipe 15 or, for example, by the provision of joints in a rigid discharge pipe, inlet end 14 of discharge pipe 15 can rise and drop together with floating weir 13 in correspondence to the variation of the liquid level in basin 9. A first buffer zone 19 thus is provided in pre-clarifying basin 9, and whose size is determined by the vertical distance between feed pipe 8 and the outlet end of discharge pipe 15. If the discharge from post-clarifying tank 20 of plant 5 also occurs in a flexible discharge pipe 18 connected to a floating weir 21, a corresponding buffer zone 22 is also provided in the post-clarifying plant. The buffer zones effect a reduction of the peak load of the clarifying plant, so that it is not necessary to start from this peak load to lay out and dimension the plant, and, with a predetermined diameter, the clarifying plant can be connected to substantially more residential units.

Figure 3:
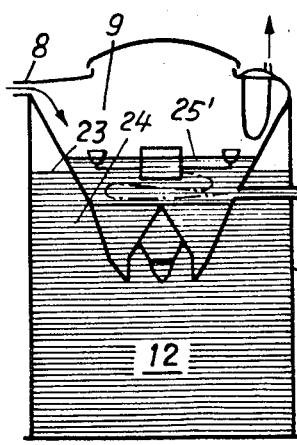
FIG. 3 is a schematic vertical sectional view of the pre-clarifying plant with a rising liquid level.
Figure 4:
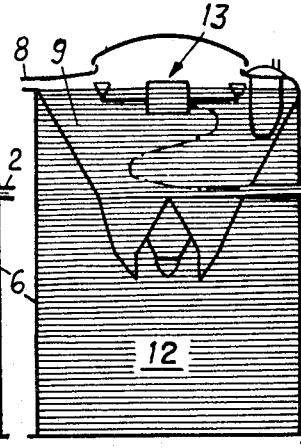
FIG. 4 is a view, similar to FIG. 3, but illustrating the maximum liquid level.
Figure 5:
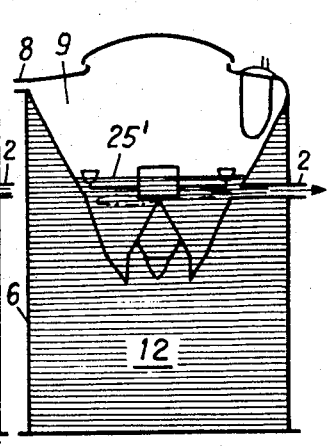
FIG. 5 is a view, similar to FIG. 3, illustrating the liquid level as established sometime after the maximum liquid level has been attained and before the liquid level drops in the buffer zone of the sludge digestion chamber or tank.

Since the sludge digestion zone of tank 12 communicates with pre-clarifying basin 9 through sludge outlet ports 11 provided in the lower part 10 of basin 9, the level 23 in zone 24, above the digestion zone of tank 6, tends to adapt itself to the liquid level 25' in pre-clarifying basin 9, as illustrated in FIGS. 3,4 and 5. However, this adaptation is delayed, in an advantageous embodiment of the invention, for example, by means of a throttle valve, which has not been shown, in the upper part of zone 24, so that a slight overpressure or underpressure prevails in the upper part of this zone in dependence on whether the liquid level has a rising tendency or a dropping tendency, and which is slowly equalized in the correspondence with the rate of flow through the throttle valve.

FIG. 3 illustrates the vertical difference of the liquid level, when the inflow occurs through a feed pipe 8 at a flow rate greater than the flow rate of the plant. Instead of a throttle valve, there can also be provided a non-return valve (not-shown), so that the air can issue faster from zone 24 with a rising liquid level than it can enter zone 24 with a dropping liquid level, due to the lack of tightness which cannot be completely avoided with conventional packings and valves. FIG. 4 illustrates the completely filled clarifying plant with its maximum load, and FIG. 5 illustrates the liquid level sometime after the maximum filling state, before level 23 can drop, due to the inflow of air into the zone 24.

Zone 24 thus forms, above sludge digestion zone or tank 12, a second buffer zone which is available much later than the first buffer zone 19 in pre-clarifying basin 9, but the greater pulsating loads appear only at intervals of several hours, or two to three times a day. The substantially delayed drop of the level 23 in zone 24 has a great advantage, however, that the return flow through sludge outlet ports 11 is so slow that the passage of water from the sludge digestion zone into the fresh raw water and into the activated sludge tank 25 of the post-clarifying plant 5 is prevented. Such a passage would have a harmful effect on the aerobic sludge treatment in the post clarification.

Side wall 17 of pre-clarifying basin 9 is inclined, so that the basin, with a round or circular cross section, is funnel-shaped. In order to prevent settling of the heavy raw water constituents on the walls of the basin, the inclination of the side wall of the basin is at least 60° and, due to the downwardly increasing restriction of the basin cross section, the solid components accumulate to an increasing extent at the bottom so that the concentrate in the four funnel tips 26, provided in the present example, in the form of sludge. From these sludge funnel tips, the sludge slides through the above-mentioned openings 11 into the sludge digestion zone 12, where it changes place with only so much water as it displaces.

Figure 2:
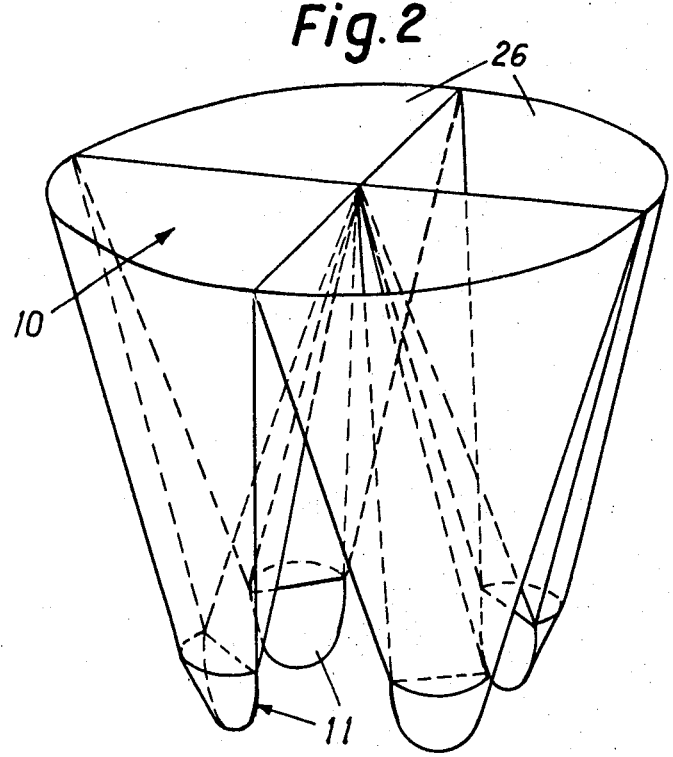
FIG. 2 is a three-dimensional representation of the lower part of the clarified basin divided into four basin chambers.

The subdivision of the lower part 10 of pre-clarifying basin 9 into several chambers or funnel tips 26 has the advantage that the total height of the pre-clarifying basin is substantially decreased, when a minimum admissible wall inclination is maintained and depositing areas for sludge are avoided, as compared to a funnel form with only one funnel tip. FIG. 2 illustrates the lower part 10 of the pre-clarifying basin 9 with the funnel tips 26. The sludge outlet port 11 provided at the bottom end of each funnel tip 26 is so dimensioned that clogging by larger particles of coarse materials is impossible.

Pre-clarifying plant 1 can be connected to an existing clarifying plant working with total oxidation, thus doubling its capacity without changing the operating costs. The post-clarifying plant shown in FIG. 1 is designed in a known manner with the difference that the post-clarifying tank, as mentioned above, is provided with a floating weir 21 and a flexible discharge pipe 18. The pre-clarified raw water from the pre-clarifying plant 1 is supplied, through an inlet pipe 27, down into the activated sludge tank 25 in which is arranged an air distributor 28. From tank 25, the water flows, under deflection, from the bottom into the post-clarifying tank 20 and over the floating weir 21, as clarified water, through the outlet pipe 29 to the outside of the plant. Since the two plants 1 and 5, and the pre-clarifying basin 9 and tank 7, respectively communicate with each other, as mentioned above, the rate of flow through the total plant can be adjusted by a diaphragm, which has not been shown, provided in outlet pipe 29, so that buffer zone 22 of the post-clarifying plant works in parallel with the buffer zone 19 of the pre-clarifying plant.

During operation of the plant, the increase in sludge is measured at periodic intervals. By suitable dimensioning of the plant, it can be attained that a semi-annual sludge evacuation is sufficient, so that no sludge is discharged onto fields during the vegetation period. The draining of sludge from activated sludge tank 25 can be effected by a drain pipe 30, shown in FIG. 1 by a broken line, which is connected to buffer zone 24 of tank 6 of pre-clarifying plant 1, so that the underpressure frequently prevailing in this zone is utilized for draining the sludge. The sludge arrives then in the sludge digestion tank or zone 12, in which there is arranged a submersible pump 31 introduced through a shaft 32 from the top into tank 6.

It will be clear that the above-mentioned division of the lower part 10 of the pre-clarifying basin 9, and the lesser height of the pre-clarifying basin 9 thus attained, substantially increases the capacity of the digestion tank to receive sludge, with the same size as the tank 6.

Due to the simple combination of pre-clarifying plant 1, of the above described type, with an existing plant of the same size working with total oxidation, the capacity is increased, for example, from 150 to 260 resident-equivalents. One resident equivalent corresponds to an amount of waste water of 200 l/capita per day and 75 grams $BOC_5$ per capita per day, where $BOC_5$ is the biochemical oxygen consumption in 5 days. In such a plant, each tank 6 and 7 has, for example, a diameter of 3.5 m and an overall height of 5 m.

While a specific embodiment of the invention has been shown and described in detail to illustrate the application of the principles of the invention, it will be understood that the invention may be embodied otherwise without departing from such principles.

What is claimed is:

1. A mechanical-biological waste water purification plant, particularly a pre-clarifying plant to be connected to a post-clarifying plant, comprising, in combination, a pre-clarifying basin having side walls; a sludge digestion zone arranged beneath and communicating with said basin; a feed inlet communicating with the upper portion of said basin; a device floating on the liquid in said basin; an adjustably positionable discharge pipe within said pre-clarifying basin and having an inlet end communicating with said device and an outlet end extending through a side wall of said basin at a level below said feed inlet; said discharge pipe providing a flow rate less than the flow rate of said feed inlet, whereby said pre-clarifying basin has a first buffer zone whose height corresponds to the vertical distance between said feed inlet and the outlet end of said discharge pipe; a tank; said pre-clarifying basin being arranged inside the upper part of said tank, and the lower part of said tank forming said sludge digestion zone, whereby said upper part of said tank defines a second buffer zone open at the bottom and delimited laterally by the wall of said tank and the side walls of said pre-clarifying basin; and at least one valve venting the upper part of said second buffer zone; whereby level equalization, effected by communication between said pre-clarifying basin and said sludge digestion zone, is delayed.

2. A mechanical-biological waste water purification plant, as claimed in claim 1, in which said discharge pipe is a flexible pipe.

3. A mechanical-biological waste water purification plant, as claimed in claim 1, in which said discharge pipe is a jointed pipe.

4. A mechanical-biological waste water purification plant, as claimed in claim 1, in which said discharge pipe has a cross sectional flow area less than the cross sectional flow area of said feed inlet.

5. A mechanical-biological waste water purification plant, as claimed in claim 1, including a flow restrictor in said discharge pipe.

6. A mechanical-biological waste water purification plant, as claimed in claim 1, in which said valve is a one-way valve opening in the air flow direction from the upper part of said second buffer zone.

7. A mechanical-biological waste water purification plant, as claimed in claim 1, in which the side walls of said pre-clarifying basin slope downwardly and inwardly so that the upper part of said basin has the greater horizontal cross section; said pre-clarifying basin, below the point at which the outlet end of said discharge pipe extends through a side wall of said basin, being divided into at least two juxtaposed basin chambers having downwardly and inwardly inclined walls, each chamber having a sludge outlet port at its bottom end.

8. A mechanical-biological waste water purification plant, as claimed in claim 1, including a post-clarifying plant having an activated sludge zone; and a drain pipe connecting said activated sludge zone of said post-clarifying plant to said second buffer zone of said pre-clarifying plant.

9. A mechanical-biological waste water purification plant, as claimed in claim 1, including a post-clarifying plant having a tank; an outlet pipe connecting said last-mentioned tank to the outlet end of said discharge pipe; said post-clarifying plant having a post-clarifying basin within said last-mentioned tank; a weir floating on the liquid in said post-clarifying basin; and an adjustably positionable second discharge pipe connected to said floating weir.

10. A mechanical-biological waste water purification plant, as claimed in claim 9, including a second outlet pipe connected to the discharge pipe of said post-clarifying plant; and a restrictor in said second outlet pipe restricting the flow rate through said first-mentioned discharge pipe.

* * * * *